United States Patent [19]

Klamann et al.

[11] Patent Number: 5,602,208
[45] Date of Patent: Feb. 11, 1997

[54] AMINOALKANOLAMIDE ESTERS AS PROCESSING AIDS FOR THERMOPLASTICS

[75] Inventors: Joerg-Dieter Klamann, Bremerhaven; Dieter Kramptiz, Moenchengladbach; Andreas Lippmann, Kaarst; Uwe Ploog, Haan, all of Germany

[73] Assignee: Henkel Kommanditgesellschaft auf Aktien, Duesseldorf, Germany

[21] Appl. No.: 196,085

[22] PCT Filed: Aug. 11, 1992

[86] PCT No.: PCT/EP92/01832

§ 371 Date: Mar. 14, 1994

§ 102(e) Date: Mar. 14, 1994

[87] PCT Pub. No.: WO93/03903

PCT Pub. Date: Mar. 4, 1993

[30] Foreign Application Priority Data

Aug. 20, 1991 [DE] Germany .......................... 41 27 471.7

[51] Int. Cl.⁶ ...................................................... C08F 20/34
[52] U.S. Cl. ........................ 525/374; 525/437; 525/467; 525/420; 525/296; 525/445; 525/426; 525/333.6; 525/333.7; 524/219
[58] Field of Search ............................ 524/219; 525/374, 525/437, 467, 470, 296, 445, 426, 333.6, 333.7

[56] References Cited

U.S. PATENT DOCUMENTS

| | | | |
|---|---|---|---|
| 3,615,288 | 10/1971 | Fezton | 431/288 |
| 3,617,323 | 11/1971 | Riegler | 106/471 |
| 4,180,492 | 12/1979 | Boussely et al. | 260/30.8 R |

FOREIGN PATENT DOCUMENTS

| | | |
|---|---|---|
| 2527214 | 11/1983 | France . |
| 4985391 | 8/1974 | Japan . |
| 2105821 | 4/1990 | Japan . |
| 2135249 | 5/1990 | Japan . |
| 1172171 | 11/1969 | United Kingdom . |

OTHER PUBLICATIONS

Journal of Physics D. Applied Physics vol. 19, No. 5, May 1986, Bristol, GB pp. 841–856.
Ullmanns Encyklopaedie der technischen Chemie, 4th Revised and Extended Edition, vol. 15, Verlag Chemie, Weinheim, 1987, pp. 568–569.
Gaechter/Müller, Kunststoffadditive, 3. Auflage, C. Hanser Verlag 1990, pp. 443–505.
Chemische Berichte 82 (1949), pp. 201–203.
Ullmann's Encyklopaefie der technischen Chemie, Band 11, 4. neubearbeitete Auflage, Verlag Chemie, Weinheim, 1976 pp. 91–93.
E. F. Pratt, D. J. Kubler, J. Am. Chem. Soc. 76 (1954), pp. 52–56.
Heuben Weyl, Band E5, Erw. + Folgebaende, 4. Auflage, 1985, pp. 302–362.

Primary Examiner—Jeffrey T. Smith
Attorney, Agent, or Firm—Wayne C. Jaeschke; John D. Wood; Daniel S. Ortiz

[57] ABSTRACT

The invention relates to the use of aminoalkanolamide esters as processing aids, more particularly as lubricants and/or mold release agents, for thermoplastics.

20 Claims, No Drawings

AMINOALKANOLAMIDE ESTERS AS PROCESSING AIDS FOR THERMOPLASTICS

BACKGROUND OF THE INVENTION

1. Field of the Invention

This invention relates to the use of aminoalkanolamide esters of carboxylic acids as processing aids for thermoplastics.

2. Discussion of Background Art

Processing aids have to be used in the processing of thermoplastics to promote melting and the formation of a homogeneous fluid melt and to facilitate the flow of the melt by reducing internal friction. This can be achieved by addition of lubricants which are added to the thermoplastic before processing. On the other hand, it is important in the processing of thermoplastics to prevent the plastic melt from adhering to hot surfaces of the machine or to the walls of the molds. Mold release agents are used for this purpose, migrating from the plastic to the surface after incorporation on account of their only limited compatibility and thus reducing adhesion. Both here and in the following, the term "mold release agent" is used synonymously for the term "external lubricant" normally used, particularly in the field of PVC. In principle, the use of processing aids also has a major influence on the morphology, homogeneity and surface quality of the plastic products.

Whether an additive acts as a lubricant or mold release agent depends on many factors, including its structure and also the type and plastic material in question, the lubricating effect and the mold release effect often being developed at one and the same time. Metal soaps, fatty acid esters and fatty acid amides are generally used as lubricants for relatively apolar plastics, such as polyethylenes and polypropylenes. Relatively polar plastics, such as polyesters, polycarbonates, polyamides, PVC, polystyrene and ABS, generally need both lubricants and mold release agents. Suitable mold release agents are fatty acid amides, metal soaps, polyethylene waxes, fatty acid esters or even silicone oil which, in general, is externally applied. Suitable internal lubricants for polar plastics divided into chemical classes are listed in Ullmanns Encyklopädie der technischen Chemie, 4th Revised and Extended Edition, Vol. 15, Verlag Chemie, Weinheim, 1978, pages 568–569 and in Gächter/Müller, Kunststoffadditive, 3rd Edition, Carl Hanser Verlag, 1990, pages 443–505.

However, known mold release agents in particular, which are mainly of importance in the processing of thermoplastics by injection molding, have one disadvantage. In injection molding, hot plastic melts are forced into a metal mold in which they cool until they can be ejected with under light pressure. With known mold release agents, a long cooling phase had to be accepted. Thus, the mold release agents only developed their full release effect at low demolding temperatures. For economic reasons, therefore, ideal mold release agents should develop a release effect at high temperatures and should enable moldings to be ejected under light ejector pressure. Known lubricants are also in need of improvement in regard to their ability to form a homogeneous fluid melt so that even complicated structures can be produced from thermoplastics, above all from polyamides, olefins and also polystyrene and copolymers (for example ABS, ASA). In addition, the processing aid should not in any way affect the color or molding behavior of the thermoplastic during processing and should be substantially nonvolatile and heat-stable.

The problem addressed by the present invention was to provide processing aids which would satisfy these requirements.

SUMMARY OF THE INVENTION

The requirements stated above for processing aids are surprisingly satisfied by aminoalkanolamide esters. Accordingly, the present invention relates to the use of one or more aminoalkanolamide ester(s) corresponding to general formula (I)

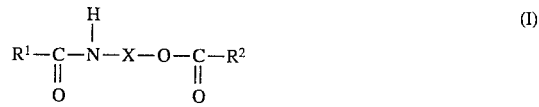

in which $R^1$ and $R^2$ may be the same or different and represent an aliphatic, saturated alkyl radical containing 1 to 49 carbon atoms, $R^1$ and $R^2$ together containing at least 14 carbon atoms, a mono- or polyunsaturated alkylene radical containing 5 to 21 carbon atoms, a phenyl radical or an alkylated phenyl radical containing 1 to 22 carbon atoms in the alkyl group and X is an aliphatic, saturated difunctional alkyl radical containing 2 to 50 carbon atoms, as processing aids for thermoplastics.

DETAILED DESCRIPTION OF THE INVENTION

Aminoalkanolamide esters are compounds known per se which are already in use in various fields of application. Thus, it is known from GB-C-1,172,171 that aminoalkanolamide esters of stearic acid, i.e. 2-stearylamidoethyl stearate, can be used as a constituent of an external anti-adhesion coating for cellulose films. It is known from Japanese patent application JP-A-85 391 of 15th August, 1974 that aminoalkanolamide esters of fatty acids, such as 2-laurylamidoethyl stearate, can be used as external lubricants for polyamide textile fibers. In this particular field of textile fibers, however, the lubricants are not incorporated in the plastic, instead the filaments are drawn through an aqueous bath containing the lubricant after their production. In the textile industry, therefore, the lubricant is directly applied to the filament surface from the outset. There is no suggestion that the aminoalkanolamide esters can be homogeneously incorporated in plastics, subsequently migrating from the plastic to its surface.

The aminoalkanolamide esters used in accordance with the invention may be obtained in known manner by esterification of aminoalcohols with monocarboxylic acids and/or carboxylic acid derivatives selected from the group consisting of carboxylic anhydrides, carboxylic acid chlorides and/or carboxylic acid esters of short-chain alcohols containing 1 to 4 carbon atoms. H. Brintzinger and H. Koddebusch describe the production of ethanolamide esters from carboxylic acid chlorides by esterification with monoor diethanolamine in the presence of pyridine, the esterification reaction being substantially complete (see Chemische Berichte 82 (1949), 201–203). The Japanese patent application cited above describes another variant of the basic process in which methyl esters of carboxylic acids are first reacted with ethanolamine and the amide obtained is subsequently reacted with more free carboxylic acid in the presence of p-toluenesulfonic acid. In principle, however, the esterification may be carried out under typical esterification conditions, for example in accordance with Ullmanns Encyklopädie der technischen Chemie, Vol. 11, 4th Revised Edition, Verlag Chemie, Weinheim, 1976, pages 91–93. In general, the reactants are reacted in the presence of esterification catalysts, such as tin compounds or tin grindings, at temperatures of 160° to 260° C. with elimination of water. If desired, the water may be azeotropically distilled off which requires the addition of an organic solvent forming an azeotrope with water. Aminoalkanolamide esters which have been produced by complete or substantially complete esterification are preferably used for the purposes of the invention. By substantially complete esterification is meant that, on a statistical average, the aminoalkanolamide esters obtained contain no free hydroxyl or carboxyl groups, preferably with an acid value below 10 an amine value below 10 and a hydroxyl value below 10.

The aminoalkanolamide esters used in accordance with the invention are derived from aminoalkanols corresponding to general formula II

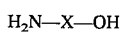
$$H_2N—X—OH \qquad (II)$$

in which X is as already defined,
and from monocarboxylic acids corresponding to the formulae $R_1COOH$ and/or $R_2COOH$ where $R_1$ and $R_2$ are as already defined. Suitable monocarboxylic acids containing aliphatic saturated alkyl radicals with 1 to 49 carbon atoms are formic acid, acetic acid, propionic acid, butyric acid, caproic acid, caprylic acid, pelargonic acid, capric acid, lauric acid, myristic acid, palmitic acid, stearic acid, arachic acid, behenic acid, lignoceric acid, cerotic acid and melissic acid and also mixtures of these acids which can be obtained from natural fats and oils. Other suitable monocarboxylic acids are montanic acid and carboxylic acids obtainable by oxidation of high molecular weight alcohols, such as the UNILIN® alcohols of the Petrolite Speciality Polymers Group, and also carboxylic acids branched in 2-position corresponding to general formula (III)

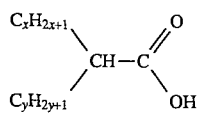

in which x and y are the same or different and represent an integer of 4 to 22, with the proviso that x+y=an integer of 10 to 42. Carboxylic acids heavily branched in the 2-position corresponding to general formula (III) can be obtained in various ways. Thus, corresponding carboxylic acids can be produced by introduction of carbon monoxide into organic molecules branched in the 2-position, such as alkanols or alkyl halides branched in the 2position, in the presence of water and acidic catalysts (Koch-Haaf synthesis). The addition of carbon monoxide onto alkenes corresponding to the formula R—CH=CHR in the presence of water and nickel, cobalt, rhodium, ruthenium, palladium and platinum compounds leads to corresponding carboxylic acids branched in 2-position. The methods used to prepare these 2-carboxylic acids as known from organic chemistry are reviewed in Methoden der organischen Chemie, HoubenWeyl, Vol. E 5, extended and revised editions up to the 4th Edition, 1985, pages 302–362. In addition, carboxylic acids branched in the a-position to the carboxyl group can be obtained by oxidation of branched-chain alcohols from petroleum chemistry, for example by oxidation of an isomer mixture of branched-chain $C_{16}$ alcohols. These branched $C_{16}$ alcohols for their part can be produced by aldol condensation of isooctyl aldehyde which in turn is obtained from isoheptane formed in the cracking of petroleum. The α-branched carboxylic acids in question can also be obtained by oxidation of the a-branched primary alcohols obtained by the Guerbet process. In the Guerbet process, saturated primary alcohols are dimerized by boiling in the presence of catalytic quantities of alkali metal hydroxide and heavy metal salts to form defined a-branched primary alcohols (cf. E. F. Pratt, D. G. Kubler, J. Am, Chem. Soc. 76 (1954), pages 52–56). For example, 2-hexyl decanol can be produced from n-octanol by the Guerbet process and can be converted by oxidation into isopalmitic acid. Examples of these carboxylic acids are 2-n-butyl-n-octanoic acid, 2-n-heptyl-n-undecanoic acid, 2-n-octyl-n-dodecanoic acid, 2-n-dodecyl-n-hexadecanoic acid and 2-n-hexadecyl-n-eicosanoic acid. Isopalmitic acid (2-n-hexyl-n-decanoic acid) produced by oxidation of 2-hexyl decanol is most particularly preferred. Suitable monocarboxylic acids containing mono- or poyunsaturated alkylene radicals containing 5 to 21 carbon atoms are lauroleic acid, myristoleic acid, palmitoleic acid, petroselaidic acid, oleic acid, elaidic acid, erucic acid, linoleic acid, linolenic acid and bassidic acid and mixtures thereof, particularly those obtainable from natural fats and oils. Among the monocarboxylic acids containing a phenyl group, alkyl derivatives of benzoic acid containing 1 to 22 carbon atoms in the alkyl radicals are emphasized in addition to benzoic acid itself. In principle, it is important when selecting the monocarboxylic acids to bear in mind that the substituents $R^1$ and $R^2$ together should contain at least 14 carbon atoms.

Preferred aminoalkanolamide esters corresponding to general formula (I) are those in which $R_1$ and $R_2$ represent an aliphatic saturated alkyl radical containing at least 5 carbon atoms and preferably 11 to 23 carbon atoms, $R^1$ and $R^2$ together containing at least 14 and preferably 16 carbon atoms, or a monounsaturated alkyl radical containing 5 to 21 carbon atoms. Accordingly, the aminoalkanolamide esters preferably used are derived from higher carboxylic acids, such as lauric acid, palmitic acid, stearic acid, lauroleic acid, palmitoleic acid, oleic acid and behenic acid and also from mixtures of these acids. Aminoalkanolamide esters corresponding to general formula (I), in which $R_2$ and $R_2$ are the same and represent an aliphatic, saturated unbranched alkyl radical containing 11 to 23 carbon atoms, are particularly preferred.

As already mentioned, the aminoalkanolamide esters used in accordance with the invention are derived from aminoalkanols corresponding to general formula (II) in which X may represent straight-chain or branched difunctional alkyl groups. X is preferably an unbranched alkyl group containing 2 to 8 carbon atoms. Suitable amino-alkanols are aminoethanols, aminopropanols, aminobutanols, aminohexanols, aminoheptanols, aminooctanols and isomers thereof, such as 2-amino-1-butanol,2-amino-2-methyl-1-propanol and/or 4-amino-4-methyl-1-hexanol. Ethanolamine, 2-amino-1-n-propanol, 3-amino-1-n-propanol, 2-amino-1-n-butanol, 3-amino-1-n-butanol and/or 4-amino-1-n-butanol are particularly preferred, ethanolamine correspond to the formula $H_2NCH_2CH_2OH$ being most particularly preferred.

Aminoalkanolamide esters corresponding to the general formula I, in which $R_1$ and $R_2$ are the same and represent an aliphatic, saturated, unbranched alkyl radical containing 11 to 23 carbon atoms and X is a difunctional unbranched alkyl radical containing 2 to 4 carbon atoms, are most particularly preferred for the purposes of the invention. Examples of this group are 2-stearylamidoethyl stearate, 2-laurylamidoethyl stearate, 2-laurylamidoethyl laurate, 2-stearylamidopropyl stearate, 2-behenylamidoethyl stearate and 2-stearylamidoethyl behenate.

In practice, the aminoalkanolamide esters are applied by addition to the thermoplastics to be processed in quantities of 0.01 to 10 parts by weight, preferably in quantities of 0.05 to 5 parts by weight and, more preferably, in quantities of 0.1 to 3 parts by weight per 100 parts by weight thermoplastic. The aminoalkanolamide esters are best added to the melt formed during production of the thermoplastic or are applied to the plastic granules or powder at elevated temperatures. For homogeneous mixing, it is advisable to extrude the aminoalkanolamide ester together with the thermoplastic at temperatures of 140° to 300° C., i.e. in the plastic melt and then to granulate the plastic mixed with aminoalkanolamide esters. The granules are optionally dried at elevated temperatures to remove the residual water.

The aminoalkanolamide esters may be added to any pure or modified thermoplastics and blends thereof, whether polymers, polycondensates or polyadducts. The aminoalkanolamide esters are particularly suitable for the processing of polyamides, polyesters, polycarbonates, polystyrenes and copolymers, polypropylene and polyethylene and blends thereof. The thermoplastics may of course be modified, such as rubber-modified polypropylene, filled with fillers, stabilized or pigmented. According to the invention, the aminoalkanolamide esters are preferably used as mold release agents and/or lubricants for thermoplastics, preferably thermoplastics which are processed by extrusion, press molding, rolling, calendering, blow molding, foaming and injection molding, preferably by injection molding. The aminoalkanolamide esters show particularly good effects as mold release agents in polar plastics, such as polyamide, polyester, polycarbonate, polystyrene and copolymers and blends thereof. By using the aminoalkanolamide esters in these plastics, the release effect is excellent and is in evidence above all even at high temperatures. In addition, the aminoalkanolamide esters act as lubricants so that uniform rapid flow of the thermoplastic melt is obtained. The aminoalkanolamide esters act particularly effectively as lubricants in polyamide, polypropylene and polyethylene, so that even complicated injection molded parts can be produced.

Finally, the aminoalkanolamide esters are compatible with other lubricants, stabilizers, pigments and fillers, so that the aminoalkanolamide esters can be added to the thermoplastics with typical additives.

The present invention also relates to moldings of thermoplastics containing aminoalkanolamide esters corresponding to general formula (I). Particulars of the quantities used, suitable aminoalkanolamide esters and plastics can be found in the foregoing.

EXAMPLES

I Preparation of the Aminoalkanolamide Esters

Example 1: 2-stearylamidoethyl stearate

In a three-necked flask equipped with a water separator, 858.7 g (3 mol) technical stearic acid (92% by weight $C_{18}$, 3% by weight $C_{16}$, 1% by weight $C_{17}$, 2% by weight $C_{20}$ 2% by weight oleic acid), acid value (DIN 53402) 196, and 91.7 g (1.5 mol) 2-amino-1-ethanol were heated with stirring under nitrogen at temperatures of 155° to 185° C. in the presence of 100 ml xylene. After about 3 hours 45 minutes, the elimination of water was over. To complete the esterification, another 8.6 g (0.14 mol) 2-amino-1-ethanol were added to the reaction mixture obtained which had an acid value of 1.8 and an amine value (DGF-C-V2; bromphenol blue) of zero. The reaction was then continued for 2 hours at 180° C. with removal of water, after which xylene was distilled off in vacuo. A yellowish hard product having a melting point of 94° C., an acid value of 1.8 and an amine value of 0.7 was obtained.

Example 2: 2-dodecylamidoethyl dodecanoate 800.8 g (4 mol) technical lauric acid (99% by weight $C_{12}$, 0.5% by weight $C_{10}$, 0.5% by weight $C_{14}$) were reacted with 122.2 g (2 mol) 2-amino-1-ethanol in the presence of xylene as in Example 1, after which the reaction product was further esterified with 10 g (0.16 mol) 2-amino-1-ethanol.

A yellowish hard product having a melting point of 75° C., an acid value of 1.8 and an amine value of 1.5 was obtained.

Example 3:

961.7 g (3 mol) technical behenic acid (2.7–3.5% by weight $C_6$, 17.3–18.5% by weight $C_{18}$, 28.6–30% by weight $C_{20}$, 45–47% by weight $C_{22}$, 2.4–3.5% by weight $C_{24}$), acid value 175, were reacted with 91.7 g (1.5 mol) 2-amino-1-ethanol in the presence of xylene as in Example 1, after which the reaction product was further esterified with 28.4 g (0.47 tool) 2-amino-1-ethanol.

A yellowish hard product having a melting point of 80° C., an acid value of 3.8 and an amine value of 0.6 was obtained.

APPLICATION EXAMPLES

Incorporation of the Additives in the Plastic

Aminoalkanolamide esters having melting points below 80° C. were applied to the plastic granules in a Henschel fluid mixer at approx. 80° C./1000 min. Aminoalkanolamide esters having melting points above 80° C. were distributed by shaking in a polyethylene bag. The aminoalkanolamide esters were uniformly incorporated in the plastic in a Collin type 235 twin-screw extruder (50×15 D) at temperatures of 190° to 265° C. The homogeneous melt was cooled in the integrated water bath and granulated by means of a round-section strand granulator. The granules were then dried. The extrusion and drying conditions of the plastics containing the incorporated aminoalkanolamide esters are shown in Table 1. The quantities are parts by weight added per 100 parts by weight thermoplastic. The plastics are:

PBT/PC=Non-reinforced high-impact blend based on polybutylene terephthalate/polycarbonate having a Vicat softening temperature of 117° C. (DIN 53 460) and a melt volume index of 5 cm³/10 mins. at 260° C./2.16 kg (Pocan® S7913, a product of Bayer AG)

PA=Polyamide 66, non-reinforced extrusion type (monofils), low melt viscosity; melt volume index 150 cm³/10 rains. at 275° C./kg (Ultramid® A 3 natur, a product of BASF AG)

PBT=Polybutylene terephthalate, unmodified, with a melt flow index of 34 g/10 mins. at 250° C./21.2 kg; Vicar softening temperature (DIN 53460) 180° C. (Vestodur® 1000, a product of Hüls AG)

PP=Polypropylene, normally stabilized, lubricant-free with a melt flow index of 5 g/10 mins. at 230° C./2.16 kg and a Vicar softening temperature of 148° C. (Hostalen® PPT 1070, a product of Hoechst AG)

PP*=Black-pigmented rubber-modified polypropylene, UV-stabilized, with a melt flow index of 4 g/10 mins. at 230° C./2.16 kg PE=Polyethylene with a density of 0.923 g/cm³ (DIN 53479) and a melt flow index of 2 to 3 g/10 mins. (DIN 53735) at 190° C./2.16 kg; crystallite melting point 115° C. (DTA) (Flamulit® PEJ 06 natur, a product of Herberts GmbH)

TABLE 1

| | | Extrusion and drying conditions | | | | | |
|---|---|---|---|---|---|---|---|
| | | Quantity of additive in | | Extrusion | | Drying | |
| Example | Additive acc. to Ex. | parts by weight | Plastic | Temperature °C. | Screw speed cm$^{-1}$ | Temperature °C. | Time in h |
| A | 1 | 0.3 | PBT/PC | 220–240 | 70 | 110 | 16 |
| B | 3 | 0.3 | PBT/PC | 220–240 | 70 | 110 | 16 |
| C | 1 | 0.5 | PA | 240–265 | 120 | 80 | 16 |
| D | 3 | 0.5 | PA | 240–265 | 120 | 80 | 16 |
| E | 1 | 0.5 | PBT | 220–235 | 70 | 110 | 16 |
| F | 2 | 0.5 | PBT | 220–235 | 70 | 110 | 16 |
| G | 1 | 1.5 | PP | 210–235 | 90 | 75 | 16 |
| H | 2 | 1.5 | PP | 210–235 | 90 | 75 | 16 |
| I | 2 | 1.5 | PP* | 210–235 | 90 | 75 | 16 |
| J | 1 | 1.0 | PE | 190–230 | 70 | 75 | 16 |

Release agent test on PBT/PC (Examples A and B)

The release agent properties were determined using a Mannesmann-Demag model D-60 NC II injection molding machine and a special demolding tool (demolding sleeve). The oil pressure building up in the ejector system during demolding of the injected sleeve is evaluated as a measure of the mold release effect of the aminoalkanolamide esters (recording of ejector pressure, core temperature during mold release and plasticizing time). A mold release sleeve with the following dimensions was injection-molded: demolding sleeve 35×35×3.5 (top) / 2.0 (bottom) height×internal diameter×wall thickness, sprue gate Injection molding parameters

| Cylinder equipment: | open nozzle, screw diameter = 28 mm, with non-return valve |
|---|---|
| Cylinder temperatures: | 225, 237, 245° C. |
| Nozzle temperature: | 255° C. |
| Screw speed: | 40 (position) (220 min.$^{-1}$) |
| Injection pressure: | 15 (approx. 280 bar) |
| Follow-up pressure: | 0 |
| Screw back pressure: | 15 |
| Ejector pressure: | 60 |
| Injection speed: | 50 |
| Ejector speed out/back: | 10/2 |
| Nozzle contact pressure: | 60 |
| Locking force: | 500 kN |
| Injection time: | 2.5 s |
| Follow-up pressure time: | 0.0 s |
| Cooling time: | 16.0 s |
| Change-over time: | 7.5 s |
| Feed delay time: | 0.5 s |
| Delay time nozzle back: | 0.5 s |
| Nozzle back, time-dependent: | 1.5 s |
| Feed: | 35.0 mm |
| Decompression: | 38.0 mm |
| Mold temperature: | on the feed side: water-cooled (7 l/min.) core: 60, 80 at 100° C. to demolding time |
| Shot weight: | approx. 15.5 g |

The demolding pressures of Examples A and B are shown in Table 2. To illustrate the values, a demolding sleeve was produced under the same conditions with no addition of additives and with addition of a mixture of 0.15 part by weight N,N-ethylene bis-stearamide and 0.15 part by weight glycerol tristearate (comparison 1).

TABLE 2

| | Mold release agents for PBT/PC | | |
|---|---|---|---|
| | Demolding pressure in bar at | | |
| Example | 60° C. | 80° C. | 100° C. |
| None | 52.5 | >85 | >85 |
| A | 23 | 11 | 16 |
| B | 54 | 26 | 34 |
| Comparison 1 | >85 | 40.5 | >85 |

It can be seen from Table 2 that a mixture of glycerol tristearate and ethylene bis-stearamide has a distinctly poorer release effect than 2-stearylamidoethyl stearate in every case.

Release Aagent Test on PA (Example C, D)

The release agent test was carried out in basically the same way as described above. The following injection molding parameters were selected:

| Cylinder equipment: | open nozzle, screw diameter = 28 mm |
|---|---|
| Cylinder temperatures: | 250, 260, 265° C. |
| Nozzle temperature: | 270° C. |
| Screw speed: | 45 (position) |
| Injection pressure: | 18 (approx. 420 bar) |
| Follow-up pressure: | 1 (approx. 260 bar) |
| Screw back pressure: | 1 |
| Ejector pressure: | 45 |
| Injection speed: | 16 |
| Ejector speed out/back: | 10/2 |
| Injection time: | 2.5 s |
| Follow-up pressure time: | 2.0 s |
| Cooling time: | 15.0 s |
| Change-over time: | 6.0 s |
| Feed delay time: | 0.5 s |
| Delay time nozzle back: | 0.5 s |
| Nozzle back, time-dependent: | 1.5 s |
| Feed: | 35.0 mm |
| Decompression: | 38.0 mm |
| Nozzle contact pressure: | 55 |
| Locking force: | 500 kN |
| Mold temperature: | on the feed side: water-cooled (8 l/min.) core: 80, 100 at 120° C. to demolding time |
| Shot weight: | approx. 14.6 g |

Lubricant Test on PA (Examples C, D)

Flow behavior was determined in a Mannesmann-Demag D 120 NC injection molding machine with a spiral mold.

The length of the spirals injected was used as a measure of the lubricating effect. The following injection molding parameters were selected:

| Cylinder equipment: | open nozzle, screw diameter = 45 mm, with non-return valve |
|---|---|
| Cylinder temperatures: | 270, 270, 270° C. |
| Nozzle temperature: | 290° C. |
| Screw speed: | 17 (position) |
| Injection pressure: | 13 (approx. 310 bar) |
| Follow-up pressure: | 8 (approx. 160 bar) |
| Screw back pressure: | 4 |
| Injection speed: | 3 |
| Injection time: | 5.0 s |
| Follow-up pressure time: | 2.0 s |
| Cooling time: | 15.0 s |
| Change-over time: | 2.0 s |
| Feed delay time: | 0.5 s |
| Delay time nozzle back: | 2.0 s |
| Nozzle back, time-dependent: | 0.5 s |
| Feed: | 34.0 mm |
| Decompression: | 38.0 mm |
| Nozzle contact pressure: | 15 |
| Locking force: | 1000 kN |
| Mold: | spiral, 3 × 15 mm, deflected at a right angle, sprue gate |
| Mold temperature: | 80° C. |
| Shot weight: | 27.0 to 33.5 g |

Table 3 shows the demolding pressures and spiral lengths; standard: without additive; as Comparison Example 2, N,N-ethylene-bis-stearamide was added to PA under the same conditions.

TABLE 3

Mold release agents/lubricants for PA

| Example | Spiral length (m) | Demolding pressure in bar at |  |  |
|---|---|---|---|---|
|  |  | 80° C. | 100° C. | 120° C. |
| None | 55 | >65 | >65 | >65 |
| C | 65.5 | 11 | 9 | 7 |
| D | 59 | 18 | 13.5 | 9.5 |
| Comparison 2 | 56 | 28 | 24.5 | 13 |

The aminoalkanolamide esters according to the invention are eminently suitable for polyamides. Thus, they are distinguished in particular by low demolding pressures at high temperatures.

Release Agent Test on PBT (Examples E and F)

The release agent test was carried out in basically the same way as described above. The following injection molding parameters were selected:

| Cylinder equipment: | open nozzle, screw diameter = 28 mm, |
|---|---|
| Cylinder temperatures: | 230, 240, 250° C. |
| Nozzle temperature: | 260° C. |
| Screw speed: | 40 (position) |
| Injection pressure: | 8 (approx. 200 bar) |
| Follow-up pressure: | — |
| Screw back pressure: | 5 |
| Ejector pressure: | 50 |
| Injection speed: | 40 |
| Ejector speed out/back: | 10/2 |
| Nozzle contact pressure: | 60 |
| Locking force: | 500 kN |
| Injection time: | 2.0 s |
| Follow-up pressure time: | — |
| Cooling time: | 20.0 s |
| Change-over time: | 8.0 s |
| Feed delay time: | 0.5 s |
| Delay time nozzle back: | 0.5 s |
| Nozzle back, time-dependent: | 1.5 s |
| Feed: | 35.0 mm |
| Decompression: | 38.0 mm |
| Mold temperature: | on the feed side: water-cooled (7 l/min.) core: 80, 100 at 120° C. to demolding time |
| Shot weight: | approx. 17.8 g |

The demolding pressures are shown in Table 4:

TABLE 4

Mold release agents for PBT

| Example | Demolding pressure in bar at |  |  |
|---|---|---|---|
|  | 80° C. | 100° C. | 120° C. |
| None | >75 | >75 | >70 |
| E | 58.5 | 41 | 23.5 |
| F | 59.5 | 43 | 26 |

Lubricant Test on PP (Examples G, H)

Flow behavior was determined in the same way as already described. The following injection molding parameters were selected:

Injection Molding Parameters

| Cylinder equipment: | open nozzle, screw diameter = 45 mm, with non-return valve |
|---|---|
| Cylinder temperatures: | 210, 220, 220° C. |
| Nozzle temperature: | 230° C. |
| Screw speed: | 17 (position) |
| Injection pressure: | 16 (approx. 400 bar) |
| Follow-up pressure: | 5 |
| Screw back pressure: | 4 |
| Injection speed: | 9 |
| Nozzle contact pressure: | 9 |
| Injection time: | 4.0 s |
| Follow-up pressure time: | 1.5 s |
| Cooling time: | 15.0 s |
| Change-over time: | 3.0 s |
| Feed delay time: | 0.5 s |
| Delay time nozzle back: | 2.0 s |
| Nozzle back, time-dependent: | 0.5 s |
| Feed: | 41.0 mm |
| Decompression: | 43.0 mm |
| Locking force: | 1000 kN |
| Mold: | spiral, 3 × 15 mm, deflected at a right angle, sprue gate |
| Mold temperature: | 60° C. |
| Shot weight: | 18 to 20.5 g |

The spiral lengths are shown in Table 5.

A mixture of 0.75 g N-N-ethylene bis-stearamide and 0.75 g calcium stearate was tested under the same conditions in PP as Comparison Example 3.

TABLE 5

Lubricants for PP

| Example | Spiral length (cm) |
|---|---|
| None | 49 |
| G | 53 |
| H | 53 |
| Comparison 3 | 51.5 |

Lubricant Test on PP* (Example I)

The lubricant test was carried out in the same way as for PP except for the following differences in the injection molding parameters:

| | |
|---|---|
| Injection pressure: | 19 (approx. 700 bar) |
| Feed: | 38.0 mm |
| Decompression: | 41.0 mm |
| Shot weight: | 18.7 to 20.6 g |

The injection lengths are shown in Table 6. Stearic acid amide was tested under the same conditions as Comparison Example 4.

TABLE 6

Lubricants for PP*

| Example | Spiral length (cm) |
|---|---|
| None | 51 |
| I | 55 |
| Comparison 4 | 54 |

Compared with commercially available stearic acid amide, the products according to the invention have an improved effect and, in addition, less tendency towards secondary reactions, such as discoloration.

Lubricant Test on PE (Example J)

Flow behavior was determined in the same way as described above. The following injection molding parameters were selected:

| | |
|---|---|
| Cylinder equipment: | open nozzle, screw diameter = 45 mm, with non-return valve |
| Cylinder temperatures: | 190 to 200° C. |
| Nozzle temperature: | 210° C. |
| Screw speed: | 16 (position) |
| Injection pressure: | 25 (approx. 700 bar) |
| Follow-up pressure: | 17 (approx. 500 bar) |
| Screw back pressure: | 4 |
| Injection speed: | 17 |
| Injection time: | 5.0 s |
| Follow-up pressure time: | 2.0 s |
| Cooling time: | 15.0 s |
| Change-over time: | 3.0 s |
| Feed delay time: | 0.5 s |
| Delay time nozzle back: | 2.0 s |
| Nozzle back, time-dependent: | 0.5 s |
| Feed: | 43.0 mm |
| Decompression: | 45.0 mm |
| Nozzle contact pressure: | 15 |
| Locking force: | 1000 kN |
| Mold: | spiral, 3 × 15 mm, deflected at a right angle, sprue gate |
| Mold temperature: | 50° C. |
| Shot weight: | 21.2 to 24.0 g |

The spiral lengths are shown in Table 7:

TABLE 6

Lubricants for PE

| Example | Spiral length (cm) |
|---|---|
| None | 55 |
| J | 58 |

We claim:

1. A composition of matter useful as a thermoplastic material comprising a homogeneous blend of:

at least one thermoplastic polymer selected from the group consisting of polyamides, polyesters, polycarbonates, polystyrenes and copolymers, polyethylenes, polypropylenes or blends thereof, and at least one compound of the formula (I)

wherein:

$R^1$ and $R^2$ may be the same or different and represent an aliphatic, saturated alkyl group containing 1 to 49 carbon atoms with the proviso that $R^1$ and $R^2$ together contain at least 14 carbon atoms, a mono- or polyunsaturated alkylene group containing 5 to 21 carbon atoms, a phenyl group or an alkylphenyl group containing 1 to 22 carbon atoms in the alkyl group and X is an aliphatic, saturated difunctional alkyl group containing 2 to 50 carbon atoms wherein the ratio by weight of the compound of formula (I) to thermoplastic polymer is from 0.01:100 to 10:100.

2. The composition as claimed in claim 1 wherein $R^1$ and $R^2$ each represent an aliphatic, saturated alkyl group containing at least 5 carbon atoms or a monounsaturated alkyl group containing 5 to 21 carbon atoms.

3. The composition as claimed in claim 1 wherein $R^1$ and $R^2$ each represent an aliphatic, saturated alkyl group containing 11 to 23 carbon atoms.

4. The composition as claimed in claim 1 wherein $R^1$ and $R^2$ each represent an aliphatic, saturated alkyl group wherein the sum of the carbon atoms in $R^1$ and $R^2$ is at least 16.

5. The composition as claimed in claim 1 wherein $R^1$ and $R^2$ are the same and represent an aliphatic, saturated unbranched alkyl group containing 11 to 23 carbon atoms.

6. The composition as claimed in claim 1 wherein X is an unbranched disfunctional alkyl group containing 2 to 8 carbon atoms.

7. The composition as claimed in claim 1 wherein $R^1$ and $R^2$ represent an aliphatic, saturated unbranched alkyl group containing 11 to 23 carbon atoms and X is a difunctional unbranched alkyl group containing 2 to 4 carbon atoms.

8. The composition as claimed in claim 1 wherein the compound of formula (I) is selected from the group consisting of 2-stearylamidoethyl stearate, 2-laurylamidoethyl stearate, 2-laurylamidoethyl laurate, 2-stearylamidopropyl stearate, 2-behenylamidoethyl stearate, 2-stearylamidoethyl behenate, 2-dodecylamidoethyl dodecanoate, and 2-behenylamidoethyl behenate.

9. The composition as claimed in claim 1 wherein said compound of formula (I) is present in an amount of 0.05 to 5 parts by weight to 100 parts by weight of said thermoplastic polymer.

10. The composition as claimed in claim 1 wherein said thermoplastic is selected from the group consisting of polyamides, polyethylenes, and polypropylenes.

11. A composition of matter useful as a thermoplastic material comprising a homogeneous blend of:

at least one thermoplastic polymer selected from the group consisting of polyamides, polyesters, polycarbonates, polystyrenes and copolymers, polyethylenes, polypropylenes or blends thereof, and at least one compound of the formula (I)

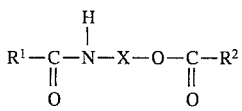

wherein:

$R^1$ and $R^2$ may be the same or different and represent an aliphatic, saturated unbranched alkyl group containing 11 to 23 carbon atoms and X is a difunctional unbranched alkyl group containing 2 to 4 carbon atoms, and wherein said compound of formula (I) is present in an amount of 0.01 to 10 parts by weight to 100 pads by weight of said thermoplastic polymer.

12. The composition as claimed in claim 11 wherein said thermoplastic is selected from the group consisting of polyamides, polyethylenes, and polypropylenes.

13. In a method of processing a thermoplastic polymer, the improvement comprising: using as a mold release agent or a lubricant for said thermoplastic polymer at least one compound of the formula (I)

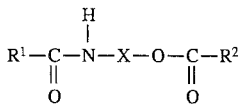

wherein, $R^1$ and $R^2$ may be the same or different and represent an aliphatic, saturated alkyl group containing 1 to 49 carbon atoms, wherein the sum of the carbon atoms in $R^1$ and $R^2$ is at least 14, a mono- or polyunsaturated alkylene group containing 5 to 21 carbon atoms, a phenyl group or an alkyl phenyl group containing 1 to 22 carbon atoms in the alkyl group and X is an aliphatic, saturated difunctional alkyl group containing 2 to 50 carbon atoms, and wherein said thermoplastic polymer is selected from the group consisting of polyamides, polyesters, polycarbonates, polystyrenes and copolymers, polyethylenes, polypropylenes or blends thereof and wherein the ratio by weight of the compound of formula (I) to the thermoplastic polymer is from 0.01:100 to 10:100.

14. The method as claimed in claim 13 wherein said process is selected from the group consisting of extrusion, press molding, rolling, calendering, blow molding, foaming and injection molding.

15. The method as claimed in claim 13 wherein said process comprises injection molding.

16. The method as claimed in claim 13 wherein said thermoplastic is selected from the group consisting of polyamides, polyethylenes, and polypropylenes.

17. The composition of claim 1 wherein the ratio of the compound of formula (I) to the thermoplastic polymer is from 0.1:100 to 3:100.

18. The composition of claim 11 wherein the amount of the compound of formula (I) is from 0.05 to 5 parts by weight to 100 parts by weight of the thermoplastic polymer.

19. The composition of claim 18 wherein the amount of the compound of formula (I) is from 0.1 to 3.0 parts by weight to 100 parts by weight of the thermoplastic polymer.

20. The method of claim 13 wherein the ratio by weight of the compound of formula (I) to the thermoplastic polymer is from 0.05:100 to 5:100.

* * * * *